(12) United States Patent
Chen et al.

(10) Patent No.: US 6,460,066 B1
(45) Date of Patent: Oct. 1, 2002

(54) 50 MHZ 40-BIT ACCUMULATOR WITH TRIGGER CAPABILITY

(75) Inventors: Lin-Chieh Chen; Cheng-Sheng Han; Chun-Yu Chao, all of Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/309,627

(22) Filed: May 11, 1999

(30) Foreign Application Priority Data

Sep. 18, 1998  (TW) ...................... 87215493 U

(51) Int. Cl.[7] .............. G06F 7/50; G06F 7/38
(52) U.S. Cl. ...................... 708/670; 708/490
(58) Field of Search .................. 708/670, 490

(56) References Cited

U.S. PATENT DOCUMENTS

| | | | |
|---|---|---|---|
| 4,215,416 A | * | 7/1980 | Muramatsu ................ 708/670 |
| 5,208,770 A | * | 5/1993 | Ito ............................ 708/670 |
| 5,937,010 A | * | 8/1999 | Petranovich et al. ........ 708/670 |
| 6,073,155 A | * | 6/2000 | Inabata et al. .............. 708/490 |
| 6,199,085 B1 | * | 3/2001 | Ihm .......................... 708/490 |

* cited by examiner

*Primary Examiner*—Tan V. Mai
(74) *Attorney, Agent, or Firm*—Kenyon & Kenyon

(57) ABSTRACT

A triggerable, pipelined 40-bit high speed accumulator includes trigger and continuous modes which can be operated at 50 MHz clock frequency. The high speed accumulator can be combined with static random access memory (SRAM) so as to be applied to digital frequency synthesizer, function generator and arbitrary waveform generator, etc. The high speed accumulator has two operation modes-trigger mode and continuous mode. Under trigger mode, the accumulator waits for a trigger signal to initiate its operation, while under continuous mode, the accumulator works without any trigger signal.

18 Claims, 1 Drawing Sheet

50 MHZ 40-BIT ACCUMULATOR WITH TRIGGER CAPABILITY

REFERENCE TO PRIOR APPLICATION

This application has been filed in the R.O.C. (Taiwan) as Patent Application No. 87215493 on Sep. 18, 1998.

FIELD OF THE INVENTION

The invention relates to an accumulator, and more particularly, to a high speed accumulator having trigger and continuous modes.

BACKGROUND OF THE INVENTION

An accumulator is generally used to perform arithmetical or logic operation. Besides, the contents of an accumulator can be cleared to 0 under program control. In addition, an accumulator is capable of performing shift, complement and test operations. Therefore, accumulators are widely used in electronic equipment.

Conventional accumulators have the following disadvantages: (1) the conventional accumulators lack trigger function, and thus can be operated in continuous mode only; (2) conventional numeric control oscillators are composed of an accumulator and a memory storing with sinusoidal waveform data, and most of the conventional accumulators cannot achieve 1 mHz frequency resolution when the accumulators are operated at 50 MHz clock frequency, wherein the frequency resolution $f_L$ of an accumulator is represented as $$f_L = f_S/2^N$$

wherein $f_S$ is the clock frequency and N is the bit number of the accumulator, because most of the conventional accumulators are 32 bits, the frequency resolution of the conventional accumulators is not good enough; and (3) most of the conventional accumulators embedded in a numerical control oscillator does not have output pin, that is to say, conventional accumulators cannot be applied to an arbitrary waveform generator.

SUMMARY OF THE INVENTION

In view of the disadvantages of the prior art, it is an object of the present invention to provide a high speed accumulator which can be operated at 50 MHz clock frequency and can be combined with static random access memory (SRAM) so as to be applied to digital frequency synthesizer, function generator and arbitrary waveform generator, etc..

It is another object of the invention to provide a high speed accumulator having two operation modes—trigger mode and continuous mode. Under trigger mode, the accumulator waits for a trigger signal to initiate its operation, while under continuous mode, the accumulator works without any trigger signal.

BRIEF DESCRIPTION OF THE DRAWINGS

For a more complete understanding of the present invention and the advantages thereof, reference is now made to the following descriptions taken in conjunction with the accompanying drawing which illustrates one or more embodiments of the present invention, wherein.

DETAILED DESCRIPTION OF THE INVENTION

Figure 1:
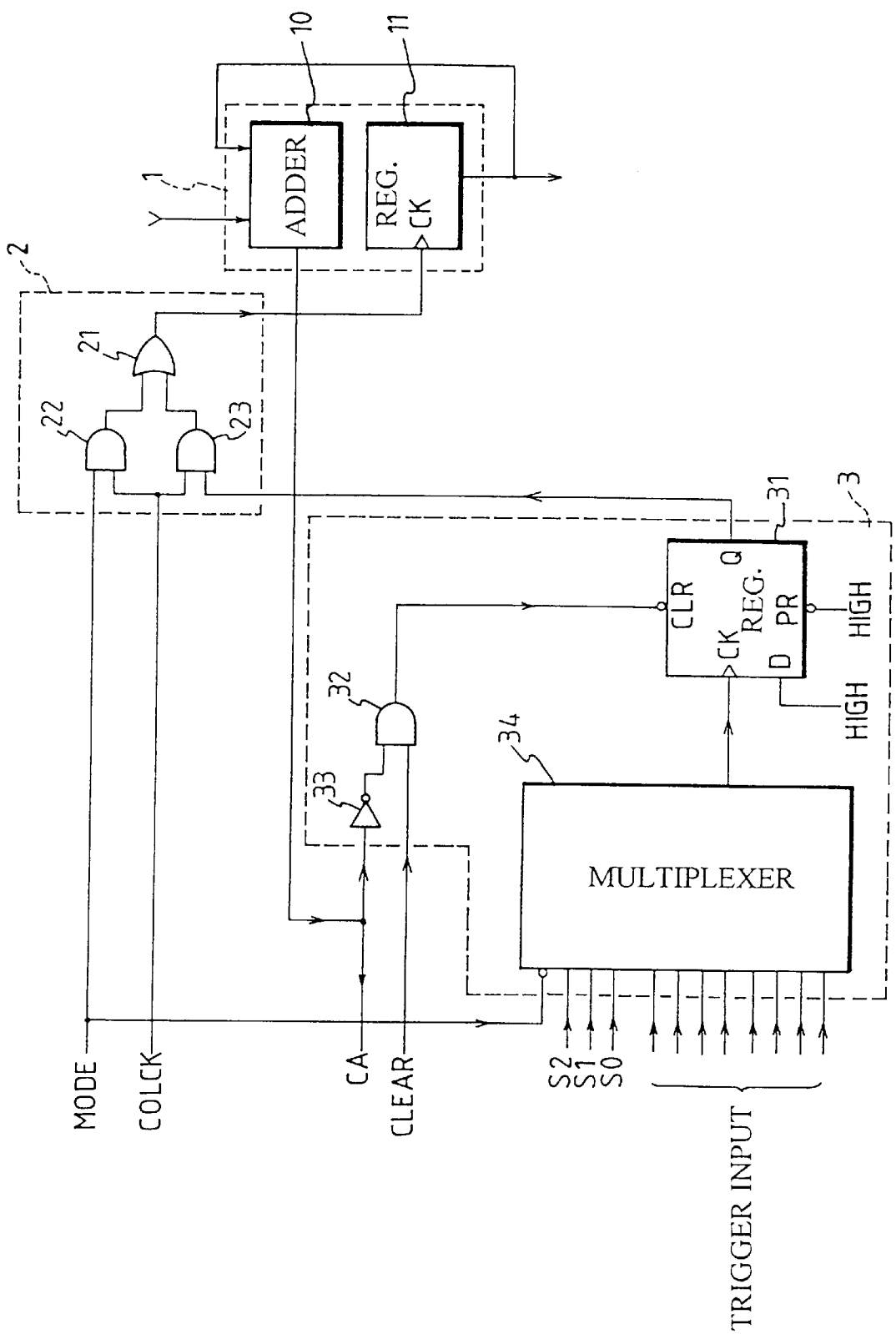
FIG. 1 illustrates a schematic diagram of the high speed accumulator having trigger and continuous modes of the present invention.

Referring to FIG. 1, it illustrates a schematic diagram of the high speed accumulator having trigger and continuous modes of the present invention. The high speed accumulator of the present invention comprises an accumulator (1), a clock control circuit (2), a trigger control circuit (3) and a plurality of input and/or control signals, wherein the accumulator (1) further comprises an adder (10) and a register (11), the clock control circuit (2) further comprises a plurality of logic gates (OR gate (21), AND gates (22 and 23)) and the trigger control circuit (3) further comprises a D-type register (31), a plurality of logic gates (AND gate (32), NOT gate (33)) and a multiplexer (34), the plurality of input and/or control signals further comprise signals of MODE, CLOCK, CA, CLEAR, TRIGGER INPUT SELECT (S2, S1, S0) and TRIGGER INPUT.

The operation of the high speed accumulator having trigger and continuous modes of the present invention is as follows:

The clock input (CK) of the accumulator (1) is controlled by the clock control circuit (2). When the MODE signal is HIGH, the accumulator (1) is operated at continuous mode. The CLOCK signal is transmitted to the accumulator (1) via AND gate (22) and OR gate (21). When the MODE signal is LOW and the CLEAR signal is HIGH, the accumulator (1) is operated at trigger mode. The output Q of the D-type register (31) is initiated to LOW and thus the clock input (CK) of the accumulator (1) is LOW and the accumulator (1) does not work. The multiplexer (34) is enabled when the MODE signal is LOW and outputs one of the 8 TTL trigger input signals in response to the TRIGGER INPUT SELECT signals S2, S1 and S0. When the selected trigger input signal is changed from LOW to HIGH, the output of the multiplexer (34) is changed from LOW to HIGH. In the meantime, the output Q of the D-type register (31) is also changed to HIGH. That is to say, the outputted trigger signal of the multiplexer (34) is a up-going edge trigger signal. It should be understood that the trigger signal can be designed as a down-going edge trigger signal or provides a converting means at output of the multiplexer (34) for converting a up-going edge trigger signal to a down-going edge trigger signal or converting a down-going edge trigger signal to a up-going edge trigger signal and the like. According to the schematic diagram of the present invention (FIG. 1), the potential of the CLR pin of the D-type register (31) is determined by a logic equation—CLR=$\overline{CA}$·CLEAR. Because the CA signal is LOW when the accumulator (1) is not carried, the CLR pin of the D-type register (31) is HIGH. However, the CLR pin and PR pin of the D-type register (31) are both LOW initiated, therefore, the accumulator (1) will be accumulated when the output Q of the D-type register (31) is HIGH. When the most significant bit (MSB) is accumulated, the CA signal becomes HIGH and causes the output of the NOT gate (33) become LOW. The output of the AND gate (32) is also become LOW. Such a LOW signal is transmitted to the CLR pin of the D-type register (31), the output Q of the D-type register (31) is thus cleared to LOW and the accumulator (1) is stopped. In addition, the CA signal can be connected to a CPU or a counter, such that the accumulator (1) and the CA signal can be reset by the CPU or the counter and waits for another trigger signal.

In view of the above, the output Q of the D-type register (31) can be cleared to LOW by CLEAR signal or CA signal. In addition, the clock input (CK) of the accumulator (1) is determined by the logic equation—MODE·CLOCK+Q·CLOCK.

The present invention discloses a triggerable, pipelined 40-bit high speed accumulator having trigger and continuous modes which can be operated at 50 MHz clock frequency. The high speed accumulator of the present invention can be combined with SRAM so as to be applied to digital frequency synthesizer, function generator and arbitrary waveform generator, etc.. Besides, the high speed accumulator of the present invention has two operation modes—trigger mode and continuous mode. Under trigger mode, the accumulator waits for a trigger signal to initiate its operation, while under continuous mode, the accumulator works without any trigger signal.

Although the present invention and its advantage have been described in detail, it should be understood that various changes, substitutions and alternations can be made herein without departing from the spirit and scope of the invention as defined by the appended claims.

What is claimed is:

1. A high speed accumulator having trigger and continuous modes, comprising:
   a plurality of input and control signals;
   a trigger control circuit, coupled to at least one of said input and control signals, for generating a first output control signal;
   a clock control circuit having a plurality of logic gates, coupled to at least one of said input and control signals and said first output control signal, for generating a second output control signal; and
   an accumulator, coupled to said second output control signal, for working under one of a trigger mode and a continuous mode in response to said second output control signal.

2. The high speed accumulator as claimed in claim 1, wherein said input and/or control signals comprise signals of MODE, CLOCK, CA, CLEAR, TRIGGER INPUT SELECT and TRIGGER INPUT.

3. The high speed accumulator as claimed in claim 2, wherein the output of said D-type register can be reset by said CLEAR signal.

4. The high speed accumulator as claimed in claim 2, wherein said CA signal is coupled to one of said plurality of logic gates in said trigger control circuit for resetting the output of said D-type register when said accumulator is accumulated to the most significant bit.

5. The high speed accumulator as claimed in claim 2, wherein said CA signal is further coupled to a CPU for resetting said accumulator.

6. The high speed accumulator as claimed in claim 2, wherein said CA signal is further coupled to a counter for resetting said accumulator.

7. The high speed accumulator as claimed in claim 1, wherein said trigger control circuit further comprises a D-type register, a plurality of logic gates and a multiplexer.

8. The high speed accumulator as claimed in claim 7, wherein said plurality of logic gates comprises an AND gate and an OR gate.

9. The high speed accumulator as claimed in claim 7, wherein said multiplexer is enabled by said MODE signal.

10. The high speed accumulator as claimed in claim 7, wherein a plurality of trigger input signals are coupled to input of said multiplexer and one of said trigger input signals is outputted at output of said multiplexer.

11. The high speed accumulator as claimed in claim 10, wherein the output of said multiplexer is coupled to clock input of said D-type register so as to control output of said D-type register.

12. The high speed accumulator as claimed in claim 10, wherein said outputted trigger signal of said multiplexer is a up-going edge trigger signal.

13. The high speed accumulator as claimed in claim 10, wherein said outputted trigger signal of said multiplexer is a down-going edge trigger signal.

14. The high speed accumulator as claimed in claim 10, wherein the output of said multiplexer is further provided with a converting means for converting a up-going edge trigger signal to a down-going edge trigger signal or converting a down-going edge trigger signal to a up-going edge trigger signal.

15. The high speed accumulator as claimed in claim 1, wherein said clock control circuit comprises two AND gates and one OR gate.

16. The high speed accumulator as claimed in claim 1, wherein said accumulator further comprises an adder and a register.

17. The high speed accumulator as claimed in claim 1, wherein result of said second output control signal is determined by either AND gate result of said MODE signal and said CLOCK signal or AND gate result of said first output control signal and said CLOCK signal.

18. A high speed accumulator having trigger and continuous modes, comprising:
   a plurality of input and control signals;
   a trigger control circuit, coupled to at least one of said input and control signals, configured to generate a first output control signal;
   a clock control circuit having a plurality of logic gates, coupled to at least one of said input and control signals and said first output control signal, configured to generate a second output control signal; and
   an accumulator, coupled to said second output control signal, configured to work under one of a trigger mode and a continuous mode in response to said second output control signal.

* * * * *